United States Patent
Lubert et al.

(10) Patent No.: US 6,221,195 B1
(45) Date of Patent: Apr. 24, 2001

(54) DEVICE FOR AUTOMATIC SETTING OF RETAINING BOLTS ON SUPPORT SURFACES

(75) Inventors: Thomas Lubert, Berlin (DE); Michel Bremont, Saint-Louis (FR); Hans-Jurgen Lesser, Rheinfelden (DE)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/269,610

(22) PCT Filed: Sep. 16, 1997

(86) PCT No.: PCT/EP97/05052

§ 371 Date: Mar. 29, 1999

§ 102(e) Date: Mar. 29, 1999

(87) PCT Pub. No.: WO98/12016

PCT Pub. Date: Mar. 26, 1998

(30) Foreign Application Priority Data

Sep. 20, 1996 (DE) .............................................. 196 38 521

(51) Int. Cl.⁷ .......................... B32B 31/20; B32B 35/00; B23P 19/00; F16B 35/00; C09J 5/06
(52) U.S. Cl. ................... 156/275.7; 156/297; 156/379.8; 156/499; 156/538
(58) Field of Search .............................. 156/272.2, 272.4, 156/273.7, 275.7, 297, 379.6, 379.8, 499, 538, 539, 598

(56) References Cited

U.S. PATENT DOCUMENTS

| | | | |
|---|---|---|---|
| 3,563,361 | * | 2/1971 | Piroutek . |
| 4,128,449 | * | 12/1978 | Kobetsky . |
| 4,139,408 | * | 2/1979 | Kobetsky . |
| 4,163,884 | * | 8/1979 | Kobetsky . |
| 4,355,222 | * | 10/1982 | Geithman et al. . |
| 4,478,669 | * | 10/1984 | Zeller et al. ................... 156/379.8 X |
| 4,602,537 | * | 7/1986 | Dixon . |
| 4,822,656 | * | 4/1989 | Hutter, III . |
| 4,853,075 | * | 8/1989 | Leslie . |
| 4,872,603 | * | 10/1989 | Stearns . |
| 5,414,247 | * | 5/1995 | Geithman et al. . |
| 5,756,185 | * | 5/1998 | Lesser . |
| 6,083,558 | * | 7/2000 | Bremont . |

FOREIGN PATENT DOCUMENTS

| | | | |
|---|---|---|---|
| 1 925 766 | * | 12/1970 | (DE) . |
| 2 230 412 | * | 1/1974 | (DE) . |
| 0 134 164 | * | 3/1985 | (EP) . |
| 0 292 758 | * | 11/1988 | (EP) . |
| 0 553 529 | * | 8/1993 | (EP) . |
| 0 495 578 | * | 7/1995 | (EP) . |
| 2 144 867 | * | 2/1973 | (FR) . |
| 1 513 052 | * | 6/1978 | (GB) . |

\* cited by examiner

*Primary Examiner*—Curtis Mayes
(74) *Attorney, Agent, or Firm*—Gifford, Krass, Groh, Sprinkle, Anderson & Citkowski, P.C.

(57) ABSTRACT

A device for automatically placing fastening bolts on support surfaces. The fastening bolts (1) have a disc plate (5) covered on their bottom side with a dry, hot-melt-type adhesive (6) receivable by heat application. The device consists of an elongated housing (3) having a bolt-catching device and a bolt feeding channel (37), which is connected to a flexible feeding tube (4) on an end projecting out of the housing. The adhesive bolts (1) with disc plate (5) are fed by air pressure into the housing (3) and through the bolt feeding channel (37) to the catching device (56, 57). There is a cylinder (11) with an induction coil (27) at the end of the bolt feeding channel (37). Upwardly from the inductor are means to press the adhesive bolts (1), which are inside the inductor (11), in the assembly position (29) on the supporting surfaces (2).

12 Claims, 4 Drawing Sheets

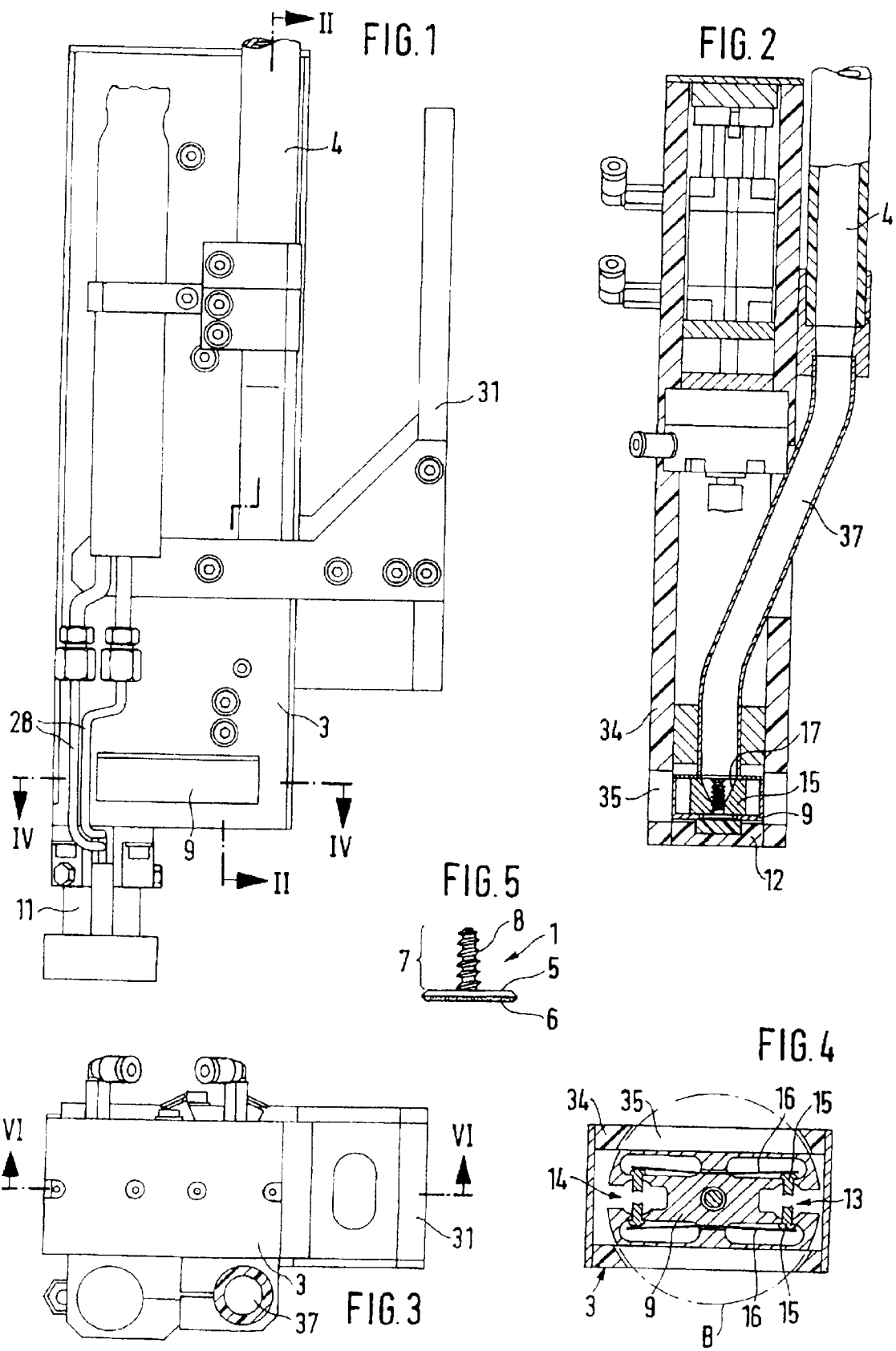

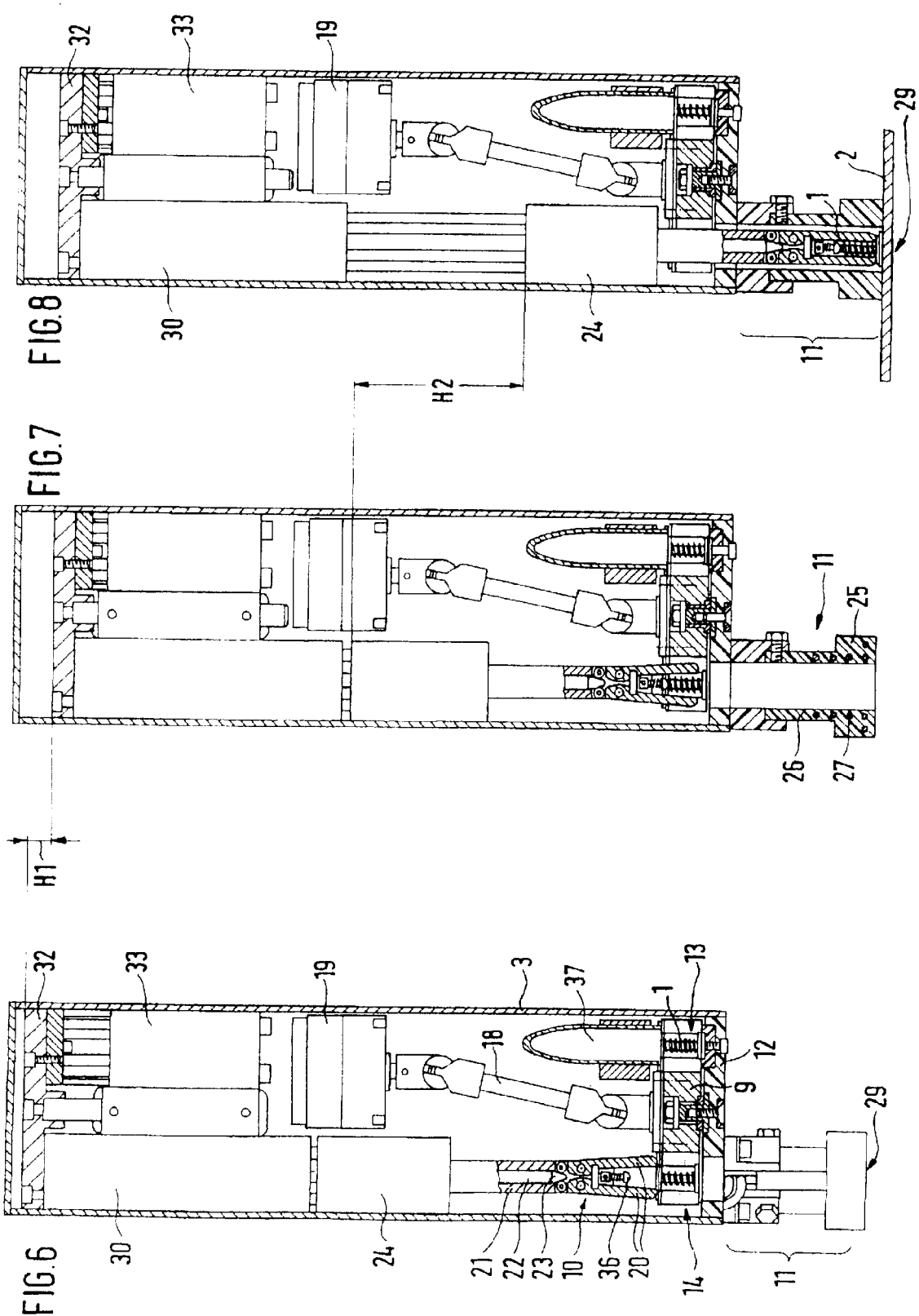

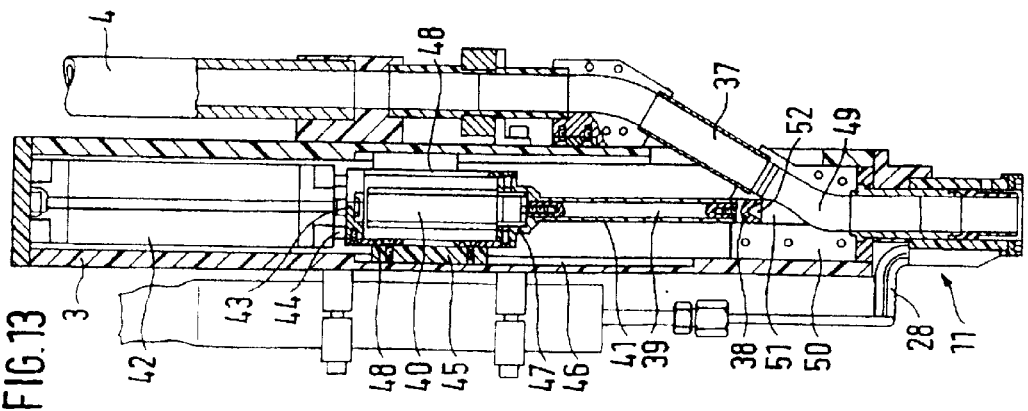
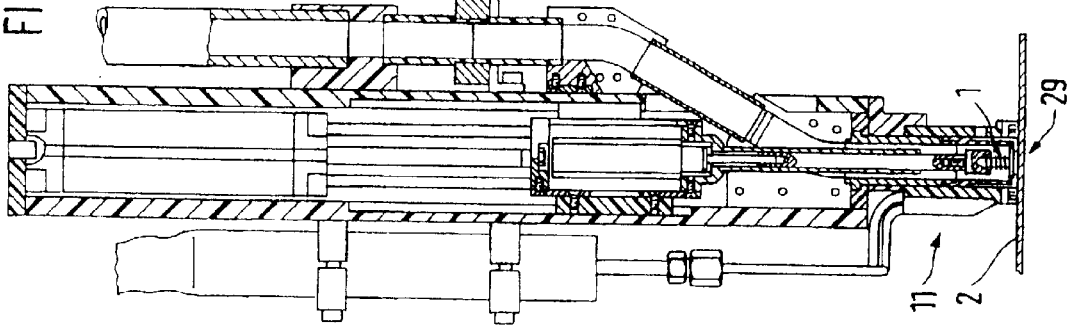
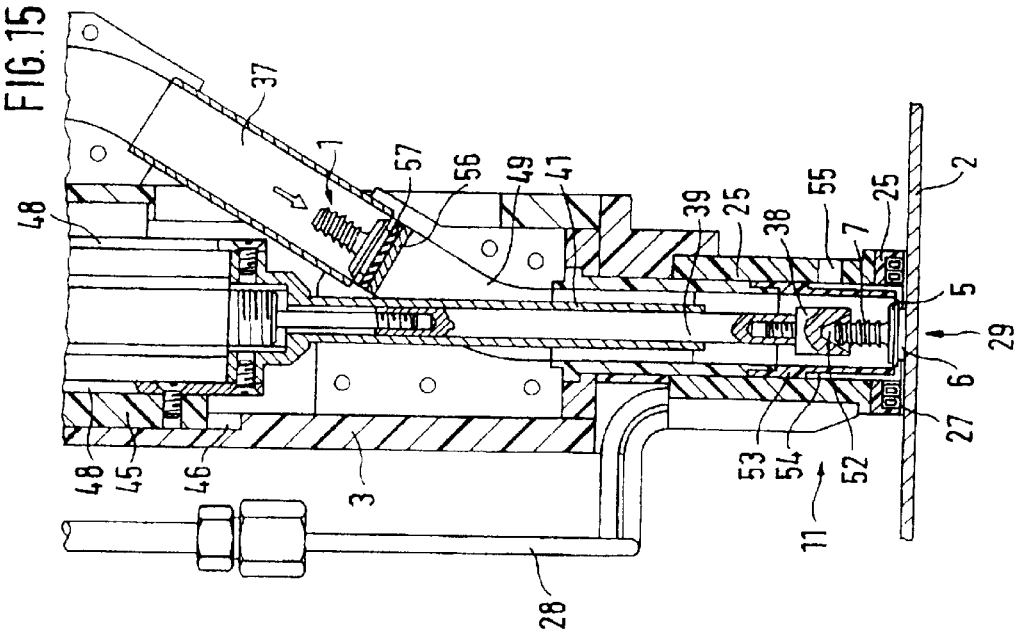

DEVICE FOR AUTOMATIC SETTING OF RETAINING BOLTS ON SUPPORT SURFACES

BACKGROUND OF THE INVENTION

The invention pertains to a device for automatic setting of retaining bolts on support surfaces, wherein the retaining bolts are provided with disk plates that are coated on their underside with a dry hot-melting adhesive that can be reactivated by the action of heat.

A device for setting such retaining bolts is known from DE 44 02 550 A1, in which the bolt shafts are seized by a pincer which can be brought into the intended bonding position by a robot arm. This publication does not discuss the manner in which bolts are supplied to the pincer, seized by it and set.

The present invention is directed to providing a device for automated setting of retaining bolts coated with hot-melting adhesive (adhesive bolts) of the aforementioned type. The adhesive bolts are brought in from a supply channel by means of compressed air and are glued to the support surfaces at the designated bonding points securely and permanently in the shortest possible time.

SUMMARY OF THE INVENTION

In order to solve this problem, a device is proposed according to the invention which is characterized by an elongated housing with a bolt-catching station and a bolt-supply channel. The bolt supply channel has an end projecting from the housing which is connected to a flexible supply hose, through which the adhesive bolts are conveyed. The bolts are conveyed disk-shoulder-first, into the housing by means of compressed air and through the bolt-supply channel up to the catching station. At the catching station a cylinder equipped with an induction coil (=inductor) is located at the end of the supply channel. Means for pressing the adhesive bolt present in the inductor onto the bonding position on the support surface are provided above the inductor.

The bolt-setting device guides the bolts disk-shoulder-first by means of a parts-separating device and a supply hose through the bolt-supply channel into the bolt-catching station. From there, the bolts are supplied to an inductor located underneath. After placing the bolts onto the bonding point the inductor induces the adhesive layer to melt by means of inductive heating and simultaneously presses the threaded bolt onto the bonding point, to produce a sufficiently firm adhesive bond with the support surface.

The bolt-catching station has the task of stopping the adhesive bolts brought in by means of compressed air as close to the bonding position as possible while preventing the impact of the disk plate provided with the adhesive layer against the support surface.

In a preferred embodiment of the bolt-setting device, a pincer of the type disclosed in DE 44 02 550 A1, seizes the bolt on its shaft and presses it onto the designated bonding position after the heating of the adhesive layer, and is employed as the means for pressing the adhesive bolt against the support surface. The bolt-catching station is located on a transfer plate seated to rotate freely underneath the bolt-supply channel and has a removal station offset by 180° from the catching station. The pincer is guided movably in the housing above the removal station in an axial extension of the inductor. The inductor is located underneath the removal station.

According to a refinement of the invention, the gluing process can be accelerated by pressing the bolt on the inductor at its lower edge onto the support surface simultaneously with the bolt disk while the latter is heated up by means of the inductor.

In order to relieve the bolt from transverse forces during the pressing, a cap is formed to be elastically deformable in the pressing direction between the gripping arms. The cap presses the bolt with uniform force against the support surface during the heating of the inductor after the opening of the gripping arms.

The gripping arms are moved by two coupled piston power cylinders: one piston power cylinder guiding the gripping arms up to the removal position in order to seize the bolt shaft, and the other moving the bolt into the bonding position at the lower edge of the inductor.

The intercalation of the clamp jaws in the two end positions of the rotating plate permits the bolts to be introduced into the uptake position with the plate and then held securely in the removal position without having to actuate the clamp jaws separately. The opening of the clamp jaws is accomplished solely by the introduction of the angled plunger tip which overcomes the force of the springs.

The inductor is to be understood as a cylindrical housing with an annular collar at the lower end, the inside diameter of which is somewhat larger than the outer diameter of the disk plate of the bolt. The inductor housing is seated on the housing underneath the removal position in an extension of the axis of displacement of the gripping arms. The housing wall of the inductor includes one or more coil windings which generate a magnetic field when current flows. Thus, both the bolt present in the inductor and the support surface are rapidly heated up. The adhesive material on the underside of the bolt disk is melted by the action of the heat, causing the bolt disk to be glued to the support surface.

In an alternative preferred embodiment of the bolt-setting device, a pressing plunger is movably guided in the housing in the axial extension of the inductor. The plunger is actuated by a power piston cylinder and is utilized as the means for pressing the adhesive bolts. The bolt-supply channel enters into the elongate axis of the inductor from one side of the housing underneath the upper position of the pressing plunger.

The pressing plunger is connected via a plunger rod to a pneumatically acting pressing cylinder which is in turn driven by a pneumatically acting advance cylinder which moves the pressing plunger from the initial position into the bonding position. Acting on the pressing plunger with two cylinders offers the advantage that the main motion of the plunger is accomplished by the advance cylinder, while the pressing cylinder is provided with a considerably shorter stroke, which is necessary to press against the adhesive bolt while the adhesive layer melts.

A slide gate is provided above the inductor transverse to the axis of the channel. The slide gate is equipped with a damping plate on the bolt supply side, to be utilized as a bolt-catching station.

BRIEF DESCRIPTION OF THE DRAWINGS

Two embodiments of the invention, which will be described in further detail below, are presented in the drawings. Shown are:

FIG. 1 is a side view of the housing of the bolt-setting device according to the invention;

FIG. 2 is a longitudinal section through the housing along line II—II in FIG. 1;

FIG. 3 is a plan view of the housing of the bolt-setting device;

FIG. 4 is a section taken through the transfer plate along line IV—IV in FIG. 1;

FIG. 5 is a side view of a threaded bolt shown in position for setting;

FIG. 6 is a longitudinal sectional view taken through the housing along line VI—VI in FIG. 3 with pincer in the initial position;

FIG. 7 is the same longitudinal sectional view as FIG. 6 with pincer lowered to the removal position;

FIG. 8 is the same longitudinal sectional view as FIG. 6, with the pincer in bolt-setting or bonding position;

FIG. 13 is a longitudinal sectional view taken through the housing of the bolt-setting device with plunger in initial position;

FIG. 14 is the same longitudinal sectional view taken through the housing with plunger in bonding position, and FIG. 15 is an enlarged sectional view of the lower setting area in the bonding position.

DETAILED DESCRIPTION OF THE PREFERRED EMBODIMENTS

Figure 10:
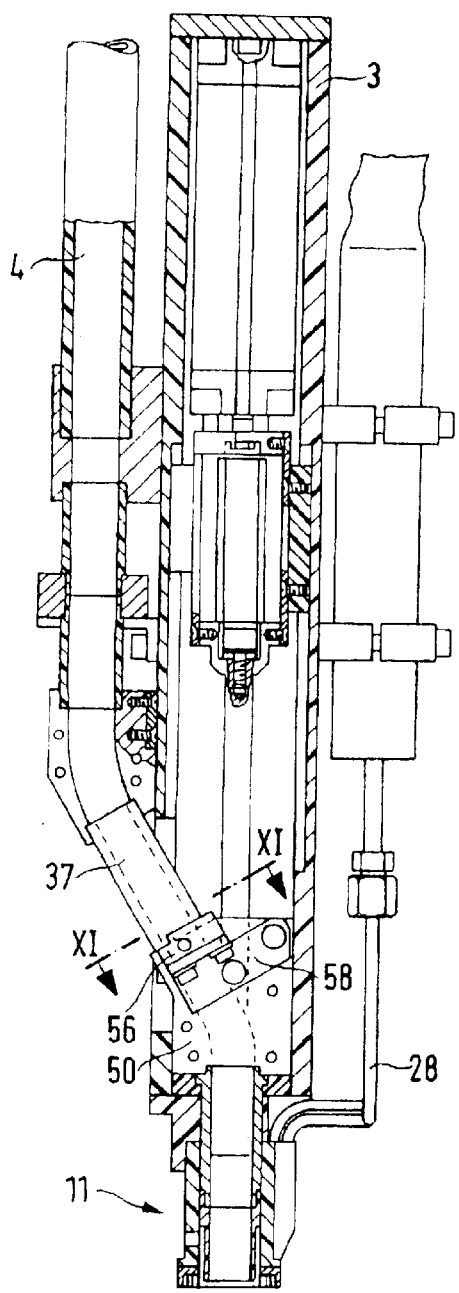
FIG. 10 is a longitudinal sectional view taken through the housing along line X—X in FIG. 9.

The bolt-setting device illustrated in the figures consists in each of the two embodiments of an elongated housing 3 with a bolt-catching device, as well as a bolt-supply channel 37, which is connected at an end exiting the housing 3 to a flexible supply hose 4. Via the hose 4, adhesive bolts 1 with the disk plate 5, FIG. 5, first are introduced by means of compressed air into the housing 3 and conveyed through the bolt-supply channel 37 up to a catching device and, from there, move into an inductor 11 located at one end of the supply channel 37. The housing 3 can be connected by means of a connector part 31 to a robot arm, not shown.

The retaining bolts 1 consist, as is shown in FIG. 5 of a shaft 7 and an adjoining disk plate 5, which is coated on its underside with a dry hot-melting adhesive 6 that can be activated by the action of heat. The shaft 7 is provided in the present embodiment with coarse threads 8 which are suited for fastening retaining elements with a receptacle hole suitably formed for threaded bolts. In place of threaded bolts, so-called head bolts or smooth bolts can be utilized if the associated fastening element has corresponding receptacles. The disk plate 5 can have any surface geometry which is suited to the conveyance by means of compressed air in the supply hose 4 or the supply channel 37.

The most important components of the bolt-setting device as shown in FIGS. 1–4 are a bolt-setting plate 9, pincer 10 and an inductor 11, all of which are integrated into the housing 3 and are described subsequently in greater detail with respect to form and function:

As shown in FIGS. 2 and 4, the transfer plate 9 is seated to rotate underneath the bolt-supply channel 37 on the housing bottom 12 the transfer plate has a catching station 13 for the successively supplied bolts 1 and, offset from this by 180°, a removal station 14. In the longitudinal wall 34 of the housing 3, there is an opening 35 adapted to receive the transfer plate as it pivots in an arc (B), shown in dashed lines.

Two respective clamp jaws 15 which can be biased together by springs, for instance, leaf springs 16, are seated in both stations of the transfer plate 9. As is evident from FIG. 2, the clamp jaws 15 are provided with inclined insertion surfaces 17 which taper apart upwardly to the diameter of the bolt-supply channel 37. The clamp jaws 15 are pressed apart by the disk plates 5 when the bolts slide over the insertion surfaces 17 and brought back into the initial position by the restoring forces of the leaf springs 16. Thus, the bolt shaft 7 is firmly gripped by the clamp jaws 15 and simultaneously centered transfer plate 9 is rotated, as is shown in FIG. 6, by way of an articulated shaft 18 and a drive motor 19 consisting of a pneumatically operated pivot cylinder installed above in the housing 3.

The pincer 10 is located above the removal station 14 and consists of two gripping arms 20 that are seated so as to be able to pivot on the lower end of a rectangular hollow profiled piece 21. The rectangular hollow profiled piece 21 is bonded to the housing 24 of a short-stroke drive unit, which is in turn connected to a power piston cylinder 30 guided to move within the housing 3. A plunger 22 acted on by the short-stroke drive unit and is guided to move in the hollow profiled piece 21 to engage its tip 23 between the extended ends of the gripping arms 20.

The gripping arms 20 are held apart by spring force and can be pressed together by pressing the upper ends of the gripping arms 20 apart with the plunger tip 23. A so-called cap 36, located between the gripping arms 20, is supported elastically in the displacement direction and is pressed against the bolt 1 when the gripping arms 20 are moved up to the bolt shaft 7.

The power piston cylinder 30 is coupled by way of a transverse plate 32 to an additional power piston cylinder 33, which is installed parallel to the displacement direction of the power piston cylinder 30 alongside it in the upper area of the housing 3. This second power piston cylinder 33 is controlled separately from the first power piston cylinder 30 so that the latter can be moved downwards in a stroke H1 by power piston cylinder 33 (FIG. 7). On the other hand, the pincer 10 is displaced by a stroke H2 into a lower setting position 29 by the power piston cylinder 30 via the housing 24 of the short-stroke drive unit (FIG. 8).

The inductor 11 is positioned under the bottom 12 of the housing in an extension of the removal station 14 of the transfer plate 9 and consists of a cylindrical housing 26 that terminates at its lower end with an annular shoulder 25. The inside diameter of the housing 26 is somewhat larger than the outside diameter of the disk plate 5, so that the bolt 1 can be freely introduced by the pincer 10 into the opening of the inductor 11.

The housing 26 has several induction coils which extend to the annular shoulder 25 and which are externally supplied with power via lines 28. As soon as the pincer 10 has lowered the bolt 1 into the interior of the inductor 11, the power is turned on via a sensor, not shown. Thereby a magnetic field is generated, which rapidly heats up the bolt 1 and thereby causes the adhesive layer 6 underneath the disk plate 5 to melt in a very short time.

The mode of operation of the above-described device is characterized by the following process steps.

First, a bolt 1 is fed from the supply channel 37 into the catching station 13 of the transfer plate 9. The clamp jaws 15 are then pressed apart by the disk plate 5 of the bolt 1 and then spring back together again, so that the bolt shaft 7 is securely held by the clamp jaws 15 (FIG. 2).

Then the plate 9 is rotated by 180° through the opening 35, and the bolt 1 is brought into the removal station 14. The pincer 10 is now lowered by the stroke H1 by the power piston cylinder 33 (FIG. 7) and the bolt shaft 7 is seized by the two gripping arms 20, which are pressed together by the plunger 22. After the robot arm has moved the setting device into the bonding position 29 (FIG. 8), the pincer 10 is moved by means of the second power piston cylinder 30 corresponding to the stroke H2 downwards until the disk plate 5 of the bolt 1 is flush with the lower edge of the inductor 11. Here, the annular shoulder of the inductor 11 contacts the support surface 2. The gripping arms 20 are now opened slightly so that the bolt 1 is pressed by means of the elastically supported cap 23 onto the support surface 2.

The induction current is then switched on and thus the magnetic field, which preferably has a frequency range of 10 kHz to 30 MHZ. The adhesive 6 on the bottom of the disk plate 7 is melted by the heat generated in this way so that the latter is bonded adhesively to the surface of the support surface 2.

After a short span of time, the strength of the bonding necessary for further processing has been achieved. Then the bolt 1 is released by the gripping arms 20 and the setting device can be moved by the robot into the next bonding position 29.

During the relatively fast-moving bonding action, the next bolt 1, has already reached the receiving station 13 of the transfer plate 9 through the supply channel 37. The transfer plate acts as a buffer and can be rotated into the receiving station 14 as soon as the pincer 10 has moved back into its initial position (FIG. 6).

An alternative embodiment of the bolt-setting device is illustrated in FIGS. 9–15 and, just like the previously described embodiment, can be mounted on the arm of a robot, not shown, or can be guided and placed by hand. The alternative embodiment differs from the above-described embodiment of FIGS. 1–4 essentially in two ways. First, the pressing of the adhesive bolt 1 in the bonding position 29 is accomplished by means of a pneumatically driven pressing plunger 38 and, second, the adhesive bolts 1 in the bolt-supply channel 37 are now caught up by a slide 56. In the description of the modified embodiment below, the components that also occur in the same design or function in the first embodiment have the same reference numbers.

The bolt-setting device consists of a housing 3 with a bolt-supply channel 37, which can be connected at an end projecting from the housing 3 to a flexible supply hose 4 for providing bolts 1. An inductor 11, which is formed from a cylindrical housing 26 that terminates at its lower end with an annular shoulder 25 is likewise placed at the end of the bolt-supply channel 37. An induction coil 27 with two windings that are supplied with power via lines 28 from the outside is inlaid into it for rapid heating.

The pressing plunger 38 is connected via a plunger rod 39 to a pressing cylinder 40 and is movably guided by pneumatic force in an axial extension of the inductor 11. The pressing cylinder 40 is in turn driven by a thruster 42 likewise under pneumatic force, which is mounted permanently in the housing 3. The cylinder moves the pressing plunger 38 from the starting position (FIG. 13) into the bonding position (FIGS. 14 and 15).

The pressing cylinder 38 is connected via a yoke plate 43 to the piston 44 of the thruster 42 and is movably guided on both sides in corresponding grooves 46 of the housing 3 by means of sliding blocks 45. The pressing cylinder 40 is positioned in the axis of motion of the thruster 42 between is yoke plate 43 and the flange 47 of a plunger rod guide 41 and is screwed to the flange 47. Flange 47 and yoke plate 43 are additionally connected by four retainer sheets 48.

The rod guide 41 is located outside the bolt-supply channel 37 in its upper starting position. The bolt supply channel enters the side of the housing 3 with an arched diverter 49 below the upper position of the pressing plunger 38 at an acute angle with respect to the extended axis of the inductor 11. The diverter 49 is milled into the divided injection channel 50 such that the adhesive bolts 1 are conveyed effortlessly into the inductor 11.

To displace the pressing plunger 38 into the bonding position 29, a guide path 51 is bored for the plunger rod guide 41 in the injection channel 50 along an extension of the axis of the inductor 11. As is particularly evident from FIG. 15, the pressing plunger 38 is screwed onto the plunger rod 39 and has the same outside diameter as the plunger rod guide 41. The plunger 38 also has a funnel-shaped cutout 52 on its pressing side which is [intended] formed to press the adhesive bolt 1 onto the support surface 2 by way of the bolt shaft 7 and simultaneously to center the bolt 1 in the inductor 11 during the adhesive bonding procedure.

Located at the end of the bolt-supply channel 38 is an air-supply nozzle 53 which ends shortly above the contact surface of the annular shoulder 25. In order to guarantee sufficient air flow through the air-supply nozzle 53 to build up a flow pressure behind the disk plate 5, a concentric gap 54 exists between the nozzle 53 and the inductor 11. The inductor housing 26 possesses several radially arranged boreholes 55 at the upper end of the gap 54, to allow the air to vent laterally from the inductor 11 when the adhesive bolt 1 is resting on the support surface 2 during the bonding process.

Figure 9:
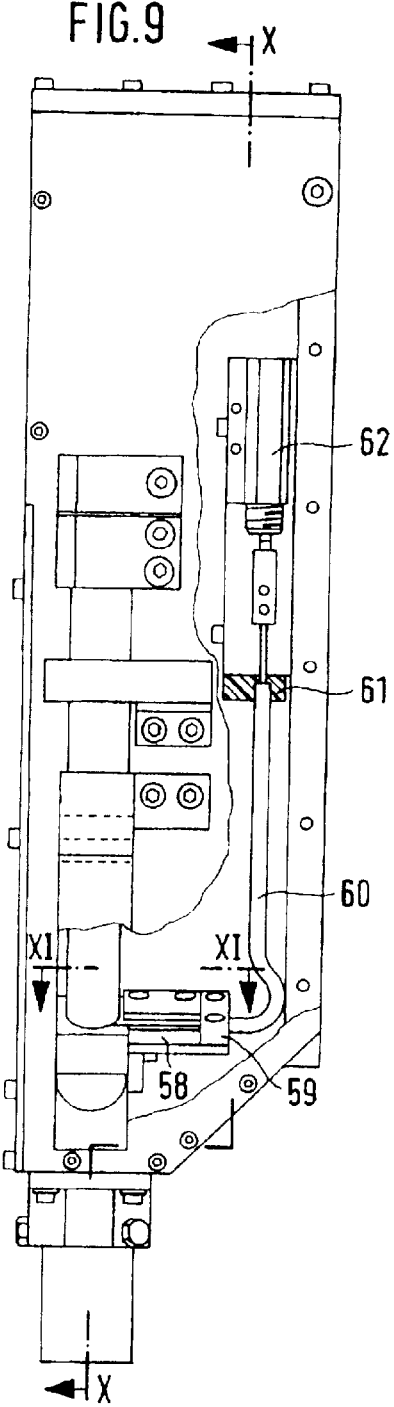
FIG. 9 is a side view of the housing of an alternative embodiment of the bolt-setting device with partial view of the slide arrangement.
Figure 12:
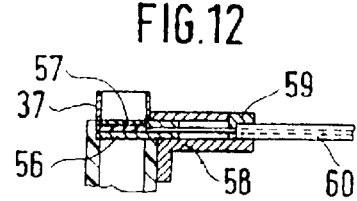
FIG. 12 is a cross sectional view of the bolt-supply channel with the slide gate taken along line XII—XII in FIG. 11.
Figure 11:
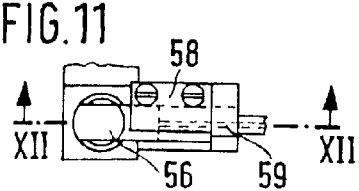
FIG. 11 is a partial cross sectional view taken through the housing along line XI—XI in FIG. 9 with plan view of the slide gate.

As is evident from FIGS. 9 and 10, a slide gate 56 is provided on the bolt-supply side with a damping plate 57. The slide gate 56 extends across the axis of the bolt-supply channel 37 the inductor 11. This slide gate 56 is movably guided in a slide housing 58 which is screwed onto the outside of the closed injection channel 50.

The slide gate 56 is connected at its rear end to a Bowden cable 60 which, as is shown in FIG. 9, is connected via an abutment 61 to an actuation cylinder 62. The cylinder 62 is permanently installed in the upper portion of the housing 3. The rearward end of the slide housing forms a slide stop 59.

The slide gate 56 can be positioned as closely in front of the inductor 11 as space conditions in the housing 3 permit to catch the bolts. It is practical, however, to arrange the slide gate 56, as drawn, in the bolt-supply channel 37 laterally alongside the guide path 51 of the pressing plunger 38, specifically, as close before the diverter 49. In this case, the slide gate 56 can be closed to catch the subsequent bolt 1 already after the advancement of the adhesive bolt 1 into the inductor 11. The previous bolt 1 remains in the bonding position 29 and is pressed by the plunger 38 against the support surface 2. In this way, the slide gate 56 can be utilized as a buffer, just like the transfer plate 9 of the initially described embodiment (see FIG. 15).

The bolt-setting device of the alternative embodiment illustrated in FIGS. 9–15 operates in the following manner:

The adhesive bolt 1 is injected through the supply hose 4 into the bolt-supply channel 37 with the slide gate 56 closed and decelerated and caught by the damping plate 57. When the inductor 11 has reached its bonding position 29, the slide gate 56 is opened by means of the actuation cylinder 62 by way of the Bowden cable 60. The adhesive bolt 1, driven by pneumatic power, moves through the diverter 49 into the inductor 1. As soon as the bolt 1 lies on top of the support surface 2, the thruster 42 and the pressing cylinder 40 are simultaneously subjected to pneumatic pressure, while the injection compressed air is briefly switched off.

The thruster 42 moves the plunger guide 41 at the same time into the bonding position, and the pressing cylinder 40 actuates the pressing plunger 38, by way of the plunger rod 39. This produces the necessary pressing force onto the adhesive bolt 1 for the adhesive bonding process after the actuation of the induction current. The displacement path of the pressing cylinder 40 is dimensioned such that the plunger 38 always remains in contact with the adhesive bolt 1 during the melting away of the adhesive layer 6, despite the narrowing of the distance between the disk plate 5 and the support surface 2.

After the desired adhesive strength of the adhesive bolt 1 has been achieved, the setting device can be retracted from the support surface 2 and brought into the next bonding position 29.

What is claimed is:

1. A process for automatically setting a plurality of bolts having a disk plate and an elongated bolt, said head of said bolts having an adhesive coated surface comprising the steps of:

feeding said bolts by means of compressed air through a housing;

placing one bolt in a bonding position surrounded by an induced magnetic field;

holding said bolt in said bonding position;

activating said magnetic field with simultaneous pressing of the disk surface onto a support surface;

releasing the bolt after reaching a minimum strength necessary for further processing.

2. The process of claim 1, wherein said magnetic field has a frequency range from 10 kHz to 30 MHZ.

3. A device for mounting of a bolt to a support surface, said bolt having a disk plate and a shaft extending from said disk plate, said disk plate having a surface coated with a hot-melt adhesive which can be reactivated by heat, said device comprising:

a housing having a bolt-supply channel, said channel having an end connected to flexible supply house, said supply hose conveying a plurality of said bolts with said disk plate first into said bolt supply channel by compressed air, said housing having a bolt-catching device positioned at another end of said bolt supply channel;

an inductor mounted to said housing to receive said bolt from said bolt supply channel and position said bolt on said supply surface which is positioned below said inductor;

means for pressing said bolt in said inductor against said support surface.

4. The device of claim 3, wherein said means for pressing further comprises a pincer and wherein said bolt catching device further comprises a transfer plate mounted within said housing to rotate between a catching station and a removal station, said catching station located beneath said bolt supply channel, said removal station being located above said inductor, said pincer engaging said bolt shaft from said transfer plate at said removal station and pressing the disk plate of the bolt against the support surface at a bonding position.

5. The device of claim 4, wherein said inductor further comprises a lower edge; said pincer positioning said disk plate of said bolt flush with said lower edge when pressing said disk plate against said support surface at said bonding position.

6. The device of claim 4, wherein said pincer has a cap elastically supported between a pair of gripping arms, said cap pressing against said bolt shaft when in said bonding position.

7. The device of claim 4, further comprising a pair of coupled power piston cylinders, one of said pair of cylinders mounted to said pincer from a rest position to a gripping position for seizing said bolt shaft, another of said pair of cylinders moving said pincer from said gripping position to said bonding position.

8. The device of claim 4, wherein said transfer plate further comprises a pair of opposed clamp jaws, each of said jaws having inclined insertion surfaces which are moveable to receive said bolt therebetween.

9. The device of claim 3, wherein said means for pressing comprises a plunger guided to move within the housing along an axial extension of said inductor, and wherein said bolt supply channel intersects said axial extension at an acute angle beneath said plunger.

10. The device of claim 9, further comprising a cylinder connected to a rod and a thruster connected to said cylinder to move the plunger from a rest position to a bonding position.

11. The device of claim 9, wherein said bolt catching device comprises a slide gate extending across an axis of said channel, said slide gate having a dampening plate for catching said bolts.

12. The device of claim 11, wherein said slide gate is positioned laterally alongside the guide path of said plunger in the bolt-supply channel.

* * * * *